United States Patent
Willis et al.

(10) Patent No.: US 9,086,855 B2
(45) Date of Patent: Jul. 21, 2015

(54) ELECTRONIC DEVICE WITH ORIENTATION DETECTION AND METHODS THEREFOR

(71) Applicant: Motorola Mobility LLC, Libertyville, IL (US)

(72) Inventors: Lawrence A Willis, McHenry, IL (US); John C Johnson, Spring Grove, IL (US); John A Renaldi, Park Ridge, IL (US)

(73) Assignee: Google Technology Holdings LLC, Mountain View, CA (US)

(*) Notice: Subject to any disclaimer, the term of this patent is extended or adjusted under 35 U.S.C. 154(b) by 99 days.

(21) Appl. No.: 14/070,760

(22) Filed: Nov. 4, 2013

(65) Prior Publication Data

US 2015/0123889 A1    May 7, 2015

(51) Int. Cl.
*G06F 1/16* (2006.01)
*G06F 3/01* (2006.01)
*G06F 3/00* (2006.01)

(52) U.S. Cl.
CPC .............. *G06F 1/1694* (2013.01); *G06F 3/005* (2013.01); *G06F 3/011* (2013.01); *G06F 3/012* (2013.01); *G06F 2200/1637* (2013.01)

(58) Field of Classification Search
CPC ........... G06F 3/02; G06F 3/0488; G06F 3/17; G06F 3/033; H04M 1/00
See application file for complete search history.

(56) References Cited

U.S. PATENT DOCUMENTS

| | | | |
|---|---|---|---|
| 7,800,592 B2 | 9/2010 | Kerr et al. | |
| 8,560,004 B1* | 10/2013 | Tsvetkov et al. | 455/550.1 |
| 2007/0236460 A1* | 10/2007 | Young et al. | 345/169 |
| 2008/0167081 A1 | 7/2008 | Eng | |
| 2010/0167783 A1 | 7/2010 | Alameh et al. | |
| 2012/0229380 A1 | 9/2012 | Silvester | |
| 2012/0259638 A1 | 10/2012 | Kalinli | |
| 2013/0009867 A1 | 1/2013 | Woo | |
| 2013/0300668 A1 | 11/2013 | Churikov et al. | |

FOREIGN PATENT DOCUMENTS

EP    2144150 A2    1/2010

OTHER PUBLICATIONS

Youngjae Im, et al, "Controllability of Touch-screen Phones based on Various Grip Postures", Proceedings of the International MultiConference of Engineers and Computer Scientists 2010 vol. III, IMECS 2010, Mar. 17-19, 2010, 5 pages, Hong Kong.

ACM Digital Library, "iRotate: Automatic Screen Rotation Based on Face Orientation", dl.acm.org/citation.cfm? id=2208374, Feb. 5, 2013, 2 pages.

* cited by examiner

*Primary Examiner* — Michael Faragalla
(74) *Attorney, Agent, or Firm* — Shumaker & Sieffert, P.A.

(57) ABSTRACT

A portable electronic device (100) for detecting type and orientation of a hand of a user is provided. The device can include a housing (101), a display (106), a control circuit (108), a first sensor (115), and a second sensor (116). The first sensor can determine a type of hand of the user supporting the portable electronic device. The second sensor can determine an orientation of the portable electronic device relative to the user. The control circuit of the portable electronic device can perform a function based on the type of hand as determined by the first sensor and the orientation of the portable electronic device as determined by the second sensor.

18 Claims, 9 Drawing Sheets

ELECTRONIC DEVICE WITH ORIENTATION DETECTION AND METHODS THEREFOR

BACKGROUND

1. Technical Field

This disclosure relates generally to electronic devices, and more particularly to electronic devices with sensors.

2. Background Art

Electronic devices, such as mobile telephones, smart phones, gaming devices, multimedia devices, portable computers, and the like, present information to users on a display. As these devices have become more sophisticated, so too have their displays. For example, not too long ago a mobile phone included only a rudimentary light emitting diode display capable of only presenting numbers and letters configured as seven-segment characters. Today, high-resolution liquid crystal and other types of displays, which are included with many portable electronic devices, have sufficient resolution to render high-definition video.

The display output is generally oriented so as to be aligned with geometric configuration of the overall device. Said differently, many electronic devices have an identifiable top and bottom. Display output is aligned in a complementary manner, with the top of the display output appearing towards the identifiable top of the device, and the bottom of the display output being aligned with the bottom of the device. Some devices even allow the display output to be rotated. For example, some devices have a gravity detector that is configured to rotate the output based on a detected gravitational field. Thus, as the device is rotated, the "top" of the output always stays above the bottom of the output.

While rotating display output based on gravity can be useful, it fails to provide suitable display output alignment in all situations. It would be advantageous to have an improved display device with improved display orientation capabilities.

Figure 1:
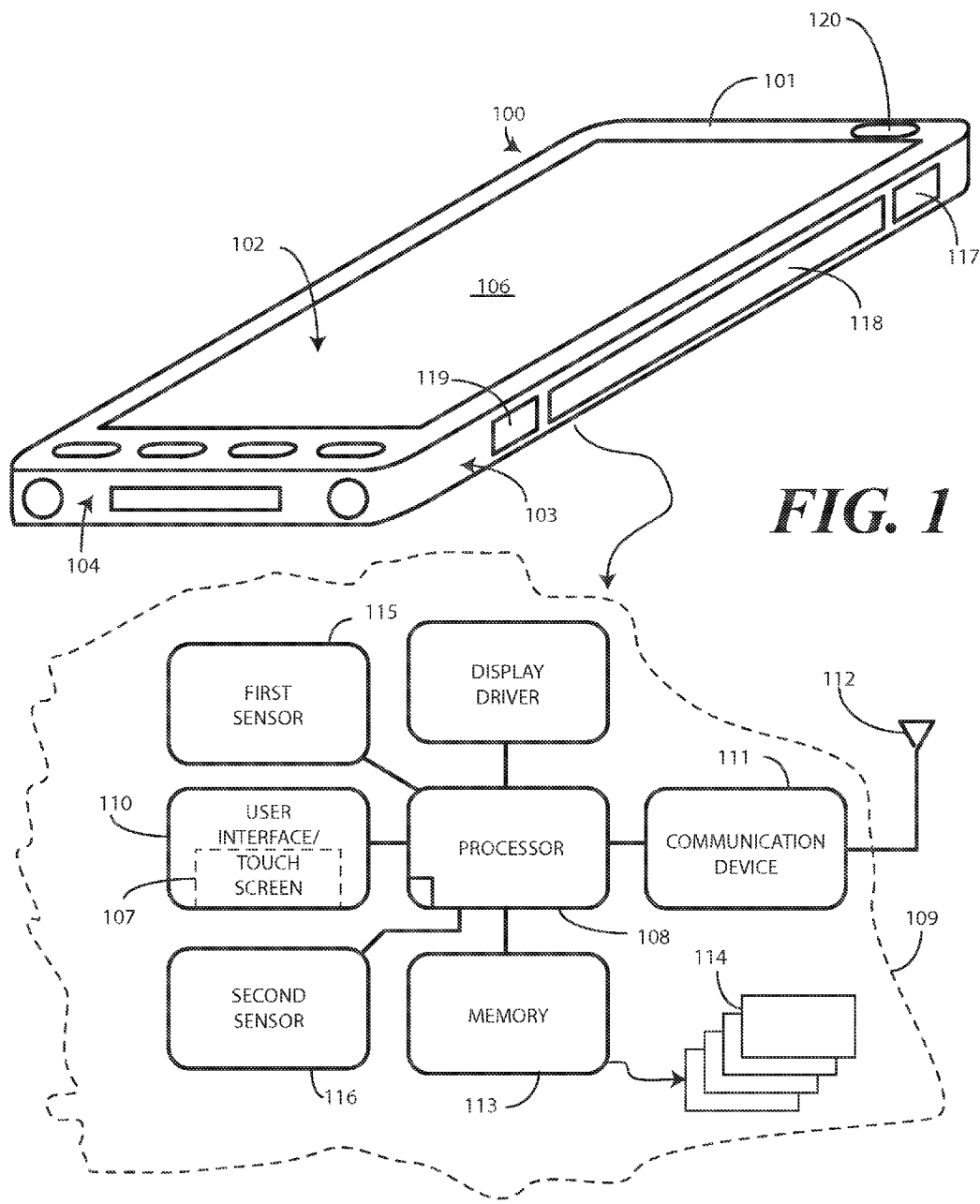
FIG. 1 illustrates one explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to detecting type and/or orientation of a hand of a user with an electronic device as described herein. Any process descriptions or blocks in flow charts should be understood as representing modules, segments, or portions of code which include one or more executable instructions for implementing specific logical functions or steps in the process. Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of detecting type and/or orientation of a hand with an electronic device as described herein. The non-processor circuits may include, but are not limited to, a radio receiver, a radio transmitter, signal drivers, clock circuits, power source circuits, and user input devices. As such, these functions may be interpreted as steps of a method to perform detection of a type, position, and/or orientation of a hand with an electronic device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide methods, circuits, systems, and devices for detecting a type, location, placement, and/or orientation of a hand on an electronic device. Once the type, location, placement, and/or orientation of the hand on the electronic device are determined, the electronic device can perform a function. In one embodiment, the electronic device employs at least two sensors to determine the type, location, placement, and/or orientation of the hand on the electronic device. The function can then be performed based upon the type, location, placement, and/or orientation of the hand on the electronic device. For example, in one embodiment the electronic device can reconfigure the presentation of a display based upon the type, location, placement, and/or orientation of the hand on the electronic device.

In one embodiment, an electronic device includes a housing. The housing can have a front surface, back surface, and first and second side surfaces disposed at either side of the front and back surfaces. A display can be disposed at a position on the front surface of the housing. A first type of sensor can be disposed at the first and second side surfaces. The first sensor can be configured to determine the type, location, placement, and/or orientation of the hand on the electronic device. Using type of hand as an example, the first sensor can determine whether a hand grasping the electronic device is a first type, e.g., a left hand, or a second type, e.g., a right hand.

A second sensor can be disposed along another surface, such as the front surface or the back surface. In one embodiment the second sensor can determine an orientation of the electronic device relative to the user. In one embodiment, the determined orientation can be one of a first orientation in which the other surface is directed toward a palm of the hand or a second orientation where the other surface is directed somewhere other than the palm of the hand. The electronic device can then perform a function in response to detecting both the type, location, placement, and/or orientation of the hand on the electronic device from the first sensor and whether the surface on which the second sensor is disposed is oriented toward or away from a palm of the detected hand.

Embodiments of the disclosure contemplate that modern electronic devices are getting larger. For example, new "tablet" style devices are being manufactured with larger displays. Many tablets are being manufactured with displays exceeding five inches in diameter. When these tablet devices can be used for activities such as making voice telephone calls, users may be accustomed to operating such devices with only one hand. However, the large display size makes single-handed operation cumbersome, difficult, or even impossible.

Embodiments of the present disclosure overcome this problem by performing functions based upon input from two or more sensors to reconfigure information and user actuation targets presented on the display. For example, in one embodiment to replicate smaller devices where single-hand operation is frequently used for certain tasks like making voice calls, sending text messages, and the like, the function performed by the electronic device may be scaling information presented on the display or translating it toward a particular portion of the user's hand, such as toward their thumb. Without the benefit of embodiments of the disclosure, on these larger devices, single-handed operation is often stymied by the ability of the thumb of the hand holding the device to reach the far side input controls on the touch screen display. Advantageously, embodiments of the disclosure can, in one embodiment, "shift" the information presented on a display toward a "thumb side" of the device to facilitate single-handed operation.

Figure 2:
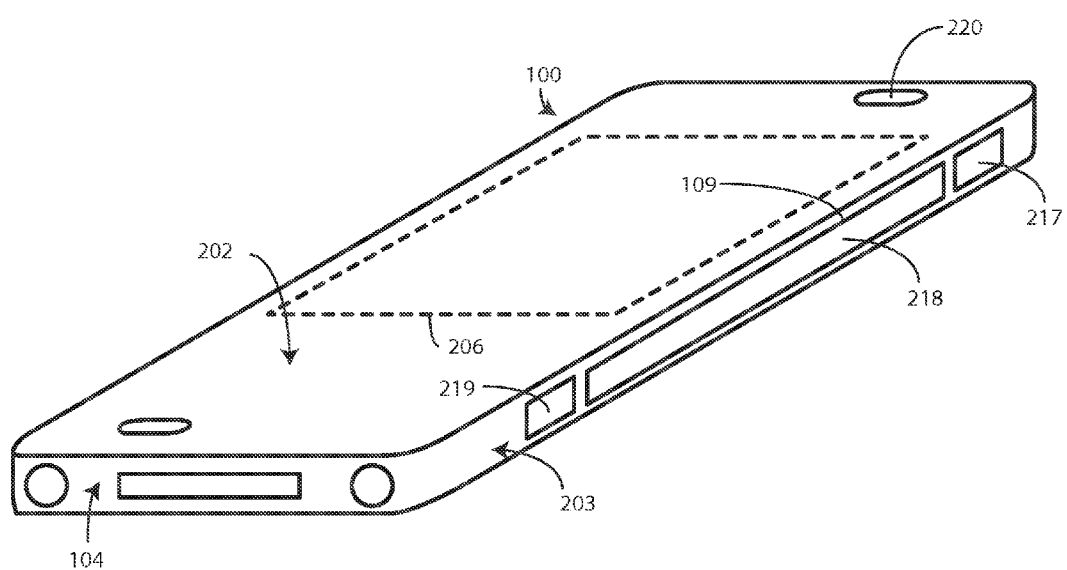
FIG. 2 illustrates another view of one explanatory electronic device configured in accordance with one or more embodiments of the disclosure.

Turning now to FIGS. 1 and 2, illustrated therein is a portable electronic device 100 configured in accordance with one or more embodiments of the disclosure. FIG. 1 illustrates a front, right bottom perspective view and a schematic block diagram, while FIG. 2 illustrates a back, left bottom perspective view of the electronic device 100. The explanatory electronic device 100 is shown as a smart phone for ease of illustration. However, it will be obvious to those of ordinary skill in the art having the benefit of this disclosure that other portable electronic devices may be substituted for the explanatory smart phone of FIGS. 1 and 2. For example, the electronic device 100 may be configured as a palm-top computer, a tablet computer, a gaming device, wearable computer, a remote controller, a media player, laptop computer, portable computer, or other electronic device.

The electronic device 100 includes a housing 101. In the illustrative embodiment of FIGS. 1 and 2, the housing 101 has a front surface 102, a back surface 202, a first side surface 103, a second side surface 203, a bottom surface 104, and a top surface 105. In one embodiment, the front surface 102 and the back surface 202 define major faces of the electronic device 100, while the first side surface 103, the second side surface 203, the bottom surface 104, and the top surface 105 define minor faces of the electronic device. In one embodiment, the back surface 202 is positioned opposite the front surface 102 relative to the housing 101. In one embodiment, the first side surface 103 is positioned opposite the second side surface 202 relative to the housing 101.

In one embodiment, a display 106 is disposed along the front surface 102 of the electronic device 100. The electronic device 100 may optionally also include another display 206 disposed along the back surface 202 of the electronic device 100 as well. As will be described below in more detail, in one embodiment the electronic device 100 performs a function based on the type of hand with which the user is supporting the electronic device 100 as determined by a first sensor 115 and the orientation of the electronic device 100 as determined by a second sensor 116. One example of this function is placing visual output on the display oriented toward the user's face and placing the display oriented toward the user's hand in a low power or sleep mode to conserve energy stored in a rechargeable battery or other energy storage device of the electronic device 100.

In one embodiment, the display 106 (and optionally the other display (206) is configured to provide visual output, images, or other visible indicia to a user. In one embodiment, the display 106 comprises an organic light emitting diode (OLED) device. In one embodiment, the display 106 comprises a touch sensor 107 to form touch sensitive display configured to receive user input across the surface of the display 106. The display 106 can also be configured with a force sensor. Where configured with both a touch sensor 107 and force sensor, a control circuit 108 can determine not only where the user contacts the display 106, but also how much force the user employs in contacting the display 106. Where configured with a force sensor but no touch sensitive capabilities, the display 106 can be used as a large "push button" or input control in one embodiment.

The touch sensor 107 can include a capacitive touch sensor, an infrared touch sensor, or another touch-sensitive technology. Capacitive touch-sensitive devices include a plurality of capacitive sensors, e.g., electrodes, which are disposed along a substrate. Each capacitive sensor is configured, in conjunction with associated control circuitry, e.g., control circuit 108 or another display specific control circuit, to detect an object in close proximity with—or touching—the surface of the display 106 by establishing electric field lines between pairs of capacitive sensors and then detecting perturbations of those field lines. The electric field lines can be established in accordance with a periodic waveform, such as a square wave, sine wave, triangle wave, or other periodic waveform that is emitted by one sensor and detected by another. The capacitive sensors can be formed, for example, by disposing indium tin oxide patterned as electrodes on a substrate of the display assembly. Indium tin oxide is useful for such systems because it is transparent and conductive. Further, it is capable of being deposited in thin layers by way of a printing process. The capacitive sensors may also be deposited on the substrate by electron beam evaporation, physical vapor deposition, or other various sputter deposition techniques. For example, commonly assigned U.S. patent application Ser. No. 11/679,228, entitled "Adaptable User Interface and Mechanism for a Portable Electronic Device," filed Feb. 27, 2007, which is incorporated herein by reference, describes a touch sensitive display employing a capacitive sensor.

The force sensor—where included—can take various forms. For example, in one embodiment, the force sensor comprises resistive switches or a force switch array configured to detect contact with either the display 106. The array of resistive switches can function as a force-sensing layer, in that when contact is made with either the surface of the display 106, changes in impedance of any of the switches may be detected. The array of switches may be any of resistance sensing switches, membrane switches, force-sensing switches such as piezoelectric switches, or other equivalent types of technology. In another embodiment, the force sensor can be capacitive. One example of a capacitive force sensor is described in commonly assigned, U.S. patent application Ser. No. 12/181,923, filed Jul. 29, 2008, published as US Published Patent Application No. US-2010-0024573-A1, which is incorporated herein by reference. In yet another embodiment, piezoelectric sensors can be configured to sense force as well. For example, where coupled with the lens of the display 106, the piezoelectric sensors can be configured to detect an amount of displacement of the lens to determine force.

In FIG. 1, the explanatory electronic device 100 is shown illustratively with a schematic block diagram 109. In this embodiment, the electronic device 100 includes a user interface 110, which includes the display 106. The illustrative electronic device 100 also includes a communication circuit 111 that can be configured for wired or wireless communication with one or more other devices or networks. The networks can include a wide area network, a local area network, or personal area network as well. The communication circuit 111 can include wireless communication circuitry, one of a receiver, a transmitter, or transceiver, and one or more antennas 112.

The electronic device 100 includes a control circuit 108, which can have one or more processors. The control circuit 108 is responsible for performing the various functions of the device. The control circuit 108 can be a microprocessor, a group of processing components, one or more Application Specific Integrated Circuits (ASICs), programmable logic, or other type of processing device. The control circuit 108 can be operable with the user interface 110 and the communication circuit 111, as well as various peripheral ports (not shown) that can be coupled to peripheral hardware devices via interface connections.

The control circuit 108 can be configured to process and execute executable software code to perform the various functions of the electronic device 100. A storage device, such as memory 113, stores the executable software code used by the control circuit 108 for device operation. The executable software code used by the control circuit 108 can be configured as one or more modules 114 that are operable with the control circuit 108. Such modules 114 can store instructions, control algorithms, and so forth. The instructions can instruct processors or control circuit 108 to perform the various steps, touch sensing, and methods described below.

In one embodiment, the electronic device 100 includes a first sensor 115 and a second sensor 116. In this illustrative embodiment, the first sensor 115 comprises one or more capacitive touchpads 117,118,119,217,218,219 disposed along the first side surface 103 and second side surface 203, respectively. In one embodiment, the first sensor 115 has a first portion positioned at the first side surface 103 of the electronic device 100 and a second portion positioned at the second side surface 203 of the electronic device. In one embodiment, the type of hand determined is based upon parts of the user's hand detected touching the first and second portions of the first sensor 115. For example, the first sensor 115 can detect the touch of parts of a user's hand at substantially opposite sides of the housing 101 in one or more embodiments.

Note that the number of capacitive touchpads 117,118,119, 217,218,219 and/or portions of the first sensor 115 can vary based upon application. Six touch pads are shown in FIG. 1, with different sizes, to illustrate the versatility of embodiments of the disclosure. However, in some embodiments the first side surface 103 and second side surface 203 may only have a single capacitive touchpad. In other embodiments, the first side surface 103 and second side surface 203 may have a single segmented capacitive touchpad disposed thereon. In yet other embodiments, the first side surface 103 and the second side surface 203 may have two, three, four, or more capacitive touchpads disposed thereon.

In one embodiment, the first sensor 115 is to determine a type of hand of the user supporting the electronic device 100. Where the first sensor 115 is configured as capacitive touchpads 117,118,119,217,218,219, the first sensor 115 can determine a type of hand of the user supporting the electronic device 100 by detecting where the user is touching the first sensor 115. For example, if the user is touching the second side surface 203 in four different places, and is touching the first side surface 103 in one location, the control circuit 108, which is operable with the first sensor 115, may conclude that the user is touching the second side surface 203 with four fingers and the first side surface 103 with the thumb. Accordingly, the control circuit 108 may conclude that—presuming the user is facing the display 106—that the type of hand of the user supporting the electronic device 100 is a type associated with the right hand of the user. By contrast, if the first sensor 115 detects contact at three places on the first side 103, and only one small one indicating a thumb—or one large one indicating possibly the heel of a hand—on the second side 203, the control circuit 108 may conclude that the type of hand of the user supporting the electronic device 100 is a second type of hand associated with a left hand of the user.

Where the first sensor 115 is configured as one or more capacitive touchpads 117,118,119,217,218,219, these capacitive touchpads 117,118,119,217,218,219 can be configured to detect contact of, for example, a user's finger or hand, within a region defined by an outer perimeter the capacitive touchpads 117,118,119,217,218,219. In one or more embodiments, the capacitive touchpads 117,118,119, 217,218,219 can further be configured to detect a direction of the movement within the region as well, as movement can further signal whether the type of hand includes a first type associated with a left hand of the user and a second type associated with a right hand of the user.

Where used, capacitive touchpads 117,118,119,217,218, 219 suitable for use with embodiments of the disclosure can be constructed in a variety of ways. For example, in one embodiment the capacitive touchpads 117,118,119,217,218, 219 are formed by horizontal conductors and vertical conductors that cross over each other to define a grid. The conductors can be coupled to a touch driver, operable with the control circuit 108, that delivers a signal to the grid. Electrical charges then travel through the grid, which defines a coordinate plane. Electromagnetic fields are then created about the capacitive touchpads 117,118,119,217,218,219. The fields are altered by interaction of a user's finger or other conductive object along the capacitive touchpads 117,118,119,217,218,219. Other forms of capacitive touchpads suitable for use with embodiments of the disclosure will be obvious to those of ordinary skill in the art having the benefit of this disclosure.

In one embodiment, the electronic device 100 also includes a second sensor 116 operable with the control circuit. Since the probability of a completely accurate determination of the type of hand from the first sensor 115 alone can be less than one hundred percent, in one or more embodiments a second sensor 116 is included to increase the probability of an accurate hand type determination.

In one embodiment, the second sensor 116 is positioned at a particular surface of the group consisting of the front surface 102 and the back surface 202. The second sensor 116 can be operable to determine an orientation of the electronic device 100 relative to the user. Two possible orientations include a first orientation in which the particular surface, e.g., the front surface 102, the back surface 202, or both, is directed toward a palm of the hand of the user, or a second orientation in which the particular surface is directed in a direction other than toward the palm of the hand. Illustrating by example, in the embodiments of FIGS. 1 and 2, the second sensor 116 is an optical sensor, and in particular an image capture device. Specifically, in this illustrative embodiment the second sensor 116 comprises a first image capture device 120 disposed on the front surface 102 and a second image capture device 220 disposed on the back surface 202 of the electronic device 100. By capturing and analyzing images from one or more of the first image capture device 120 or the second image capture device 220, the control circuit 108 can determine which of the front surface 102 or the back surface 202 is oriented toward the palm of the user, and thus the electronic device 100 can determine whether it is in a first orientation or a second orientation based upon the image. This information, combined with the input from the first sensor 115, allows the control circuit 108 to make highly accurate determinations of the type of hand with which the user is supporting the electronic device 100. Accordingly, the electronic device 100 can perform a function, examples of which will be described below, based on the type of hand as determined by the first sensor 115 and the orientation of the electronic device 100 as determined by the second sensor 116.

An image capture device is not the only type of optical device suitable for use as the second sensor 116. In another embodiment, the second sensor 116 comprises a detector configured to detect relationships between the user and the electronic device 100. The detected relationship information can be used by the control circuit 108 to do many things: provide an image at a position of the display 106 based on the type of hand as determined by the first sensor 115 and the orientation of the electronic device 100 as determined by the second sensor 116; prioritize displays 106,206 where multiple displays 106,206 are used; control the presentation of data on the displays 106,206; alter the presentation of data on the displays 106,206; and other functions. In one embodiment, the second sensor 116 comprises a gaze detector. In another embodiment, the second sensor 116 comprises an orientation detector. In another embodiment, the second sensor 116 comprises a combination orientation and gaze detector.

Where the second sensor 116 comprises an orientation detector, the orientation detector is configured to detect a physical and/or spatial orientation of the electronic device 100 relative to the user. The orientation detector can take a number of forms.

In one embodiment, the orientation detector comprises a light sensor configured to detect changes in optical intensity, color, light, or shadow in the near vicinity of the electronic device 100. For example, the light sensor can be configured as an imaging device, e.g., image capture devices 120,220, that captures successive images about the device and compares luminous intensity, color, or other spatial variations between images to detect motion or the presence of an object, such as the user, near the electronic device 100. Such sensors can be useful in determining at which surface of the electronic device 100 is oriented toward a user and which surface of the electronic device is oriented toward a palm or away from a user.

In another embodiment, the orientation detector can comprise an infrared sensor. The infrared sensor can be used in conjunction with, or in place of, the light sensor. The infrared sensor can be configured to operate in a similar manner, but on the basis of infrared radiation rather than visible light. The light sensor and/or infrared sensor can also be used to detect gesture commands, which can be used to determine the orientation of the user relative to the electronic device 100. The orientation of the electronic device 100 relative to the user can be detected from a light-sensed user action or an infrared-sensed user action, such as movement of the user's body, hands, or limbs away from the electronic device 100.

In another embodiment, the orientation detector can comprise an accelerometer. The accelerometer can be configured to determine the orientation of the electronic device 100 relative to the user by detecting motion of the electronic device 100. For example, a user holding the electronic device 100 on the right hand can only make certain types of gestures due to the way that the right arm is linked to the torso. These motions are distinct from those made by the left arm due to the complementary connection of the left arm to the torso as compared to the right. The accelerometer can be used to determine the location of the user relative to the electronic device 100 by detecting a series of gestures and deducing upon which appendage the electronic device 100 is being held or not held. The accelerometer can also be used to determine the spatial orientation of the electronic device 100 in three-dimensional space by detecting a gravitational direction. In addition to, or instead of, the accelerometer, an electronic compass can be included to detect the spatial orientation of the electronic device 100 relative to the earth's magnetic field. Similarly, one or more gyroscopes can be included to detect rotational motion of the electronic device 100. The gyroscope can be used to determine the spatial rotation of the electronic device 100 in three-dimensional space.

In another embodiment, the second sensor 116 comprises one or more microphones. The microphones can be included to receive voice input, voice commands, and other audio input. A single microphone can be included. Optionally, two or more microphones can be included. Sounds received by the microphones can be used to determine the location of the user relative to the electronic device 100. The orientation detector can also comprise any of an audio sensor, an infrared sensor, a thermal sensor, a an imager, or combinations thereof In one or more embodiments, rather than simply detecting the orientation of the electronic device 100 relative to the user, the second sensor 116 is capable of determining more specific information about the user. For example, in one embodiment the second sensor 116 comprises a gaze detector configured to detect a gaze direction from the user.

Gaze detectors are known in the art. Examples are provided, e.g., in commonly assigned U.S. patent application Ser. No. 13/407,116, filed Feb. 28, 2012, which is incorporated herein by reference. The '116 application provides references illustrative of the state of the art only. Generally speaking, gaze detectors comprise sensors for detecting the user's gaze point. They can optionally include sensors for detecting the alignment of a user's head in three-dimensional space. Electronic signals can then be delivered from the sensors to the control circuit 108 for computing the direction of user's gaze in three-dimensional space. The gaze detector can further be configured to detect a gaze cone corresponding to the detected gaze direction, which is a field of view within which the user may easily see without diverting their eyes or head from the detected gaze direction. The gaze detectors can be configured to alternately estimate gaze direction by inputting to the control circuit 108 images representing a photograph of a selected area near or around the eyes. It will be clear to those of ordinary skill in the art having the benefit of this disclosure that these techniques are explanatory only, as other modes of detecting gaze direction can be substituted in the second sensor 116.

As will be described below in further detail, in one embodiment the control circuit 108 can use information received from the first sensor 115 and the second sensor 116 to perform a function such as altering the presentation of data on the display(s) 106,206. For example, the control circuit 108 can provide an image at a position of the display(s) 106,206 based on the type of hand, as determined by the first sensor 115, and the orientation of the electronic device 100, as determined by the second sensor 116. Where the second sensor 116 comprises a gaze detector, the control circuit 108 can be configured to alter a presentation of data on the display(s) 106,206 based upon the combination of a detected gaze direction determined by the second sensor 116 and a type of hand as determined by the first sensor 115. Where the second sensor 116 comprises an orientation detector, the control circuit 108 can be configured to prioritize one or more display(s) 106,206 or can prioritize one or more portions of the display(s) 106, 206 based upon the combination of a detected orientation of the electronic device 100 relative to the user determined by the second sensor 116 and a type of hand as determined by the first sensor 115.

Figure 3:
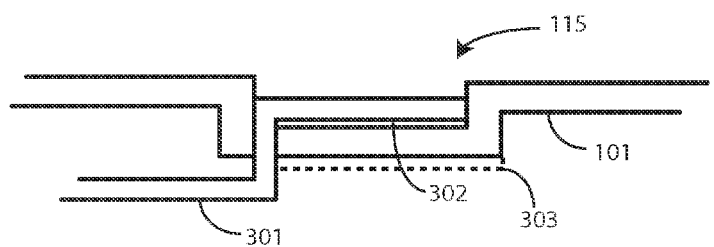
FIGS. 3-5 illustrate embodiments of touch sensors configured in accordance with one or more embodiments of the disclosure.
Figure 4:
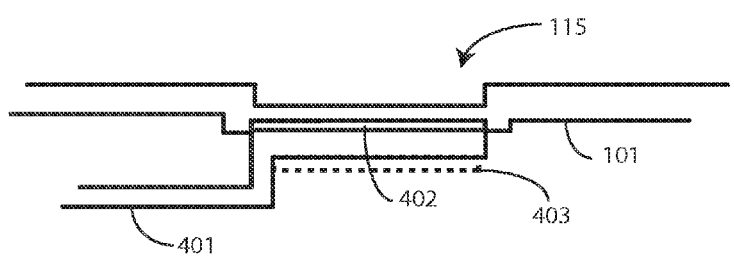
Figure 5:
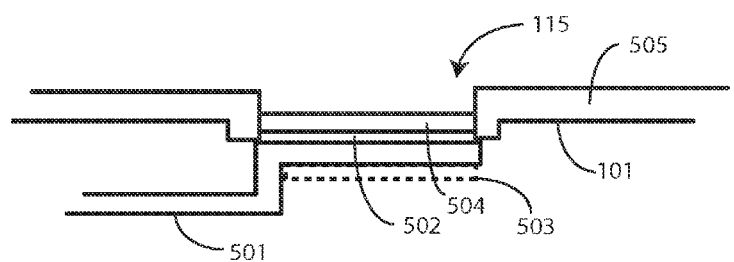

Turning now to FIGS. 3-5, illustrated therein are examples of different ways that the touch sensitive surfaces of the first sensor 115 can be constructed in accordance with embodiments of the disclosure. Each figure shows a side elevation view of a different embodiment of a touch sensitive surface configured in accordance with one or more embodiments of the disclosure. Each embodiment may offer an advantage for a particular application. Illustrating by example, the embodiment of FIG. 3 may require less power in the capacitive sensor due to the fact that the capacitive sensor is disposed closer to the user's finger at actuation. The embodiment of FIG. 4 may result in a lower cost assembly due to fact that the assembly is simpler to manufacture. The embodiment of FIG. 5 can result in a lower assembly cost and lower power consumption as conductive material connects to the capacitive sensor at a location closer to the user's finger at actuation.

Beginning with FIG. 3, the first sensor 115 includes a capacitive touchpad 301. In the illustrative embodiment of FIG. 3, a housing 101 of an electronic device (100) is attached to the capacitive touchpad 301. The housing 101 of this illustrative embodiment is a rigid layer formed of metal, plastic, or another housing material. In one embodiment, the housing 101 is manufactured from a non-conductive material. Examples of a non-conductive material would include ABS plastic, polycarbonate, or ABS-polycarbonate, and other resins. An adhesive layer 302 is disposed between an inner surface of the capacitive touchpad 301 and the housing 101 to bond the two together.

In one embodiment, an optional haptic layer 303 is configured to provide a sensory feedback when a user actuates a virtual key. In one embodiment, the optional haptic layer 303 includes a piezoelectric transducer configured to apply a mechanical "pop" to the body of the device that is strong enough to be detected by the user. Thus, the optional haptic layer 303 provides sensory feedback to the user, thereby making the first sensor 115 react similar to a conventional keypad when actuated.

In FIG. 4, the first sensor 115 again includes a housing 101. In one embodiment, the housing 101 is manufactured from a non-conductive material. An adhesive layer 402 is then disposed between the housing 101 and a capacitive touchpad 401. The adhesive layer 402 bonds the capacitive touchpad 401 to the housing 101. In one embodiment, an optional haptic layer 403 is configured to provide a sensory feedback when a user actuates the first sensor 115.

In FIG. 5 the first sensor 115 includes a conductive portion 504 of the housing 101. The housing 101 includes both a non-conductive portion 505 and a conductive portion 504. The non-conductive portion 515 is disposed on either side of the first sensor 115, while the conductive portion 504 is disposed along the width and length of the first sensor 115. Examples of a conductive material suitable for forming the conductive portion 504 would be metal, metallized plastic, or carbon impregnated plastic.

An adhesive layer 502 is then disposed between the conductive portion 504 of the housing 101 and a capacitive touchpad 501. The adhesive layer 502 bonds the capacitive touchpad 501 to the conductive portion 504 of the housing 101. In one embodiment, an optional haptic layer 503 is configured to provide a sensory feedback when a user actuates the first sensor 115.

Figure 6:
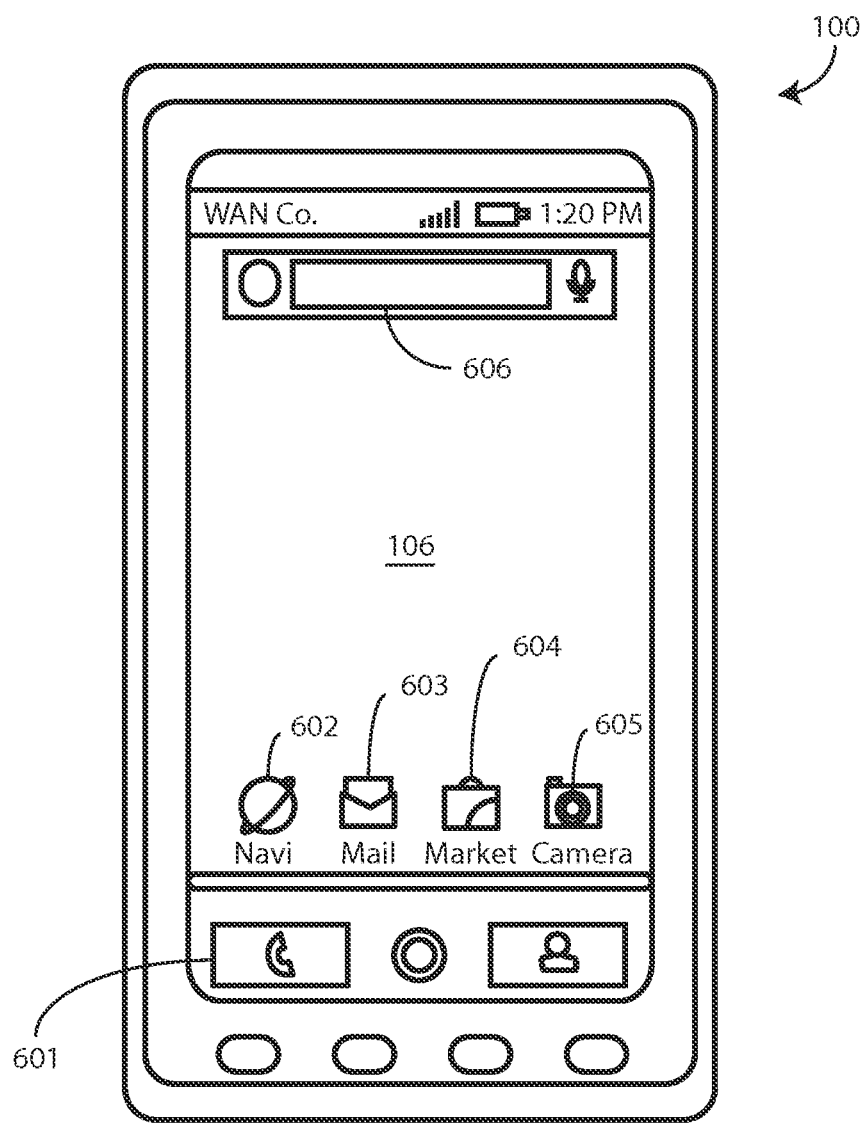
FIG. 6 illustrates one explanatory electronic device operating in a first mode in accordance with one or more embodiments of the disclosure.

Turning now to FIG. 6, illustrated therein is the electronic device 100 of FIG. 1 operating in a first mode. The first mode includes an associated operating system environment, which is configured as executable code operating on one or more processors or control circuits of the electronic device 100. In this illustrative embodiment, the operating system environment has associated therewith various applications or "apps." Examples of such applications shown in FIG. 6 include a cellular telephone application 601 for making voice telephone calls, a navigation application 602 configured to provide mapping and navigation information to the user on the display 106 of the electronic device 100, an electronic mail application 603 configured to send and receive electronic mail, a shopping application 604 configured to permit a user to shop for goods and services online, and a camera application 605 configured to capture still (and optionally video) images. An Internet and/or local search application 606 is also provided. The Internet and/or local search application 606 allows a user to search the web or the local device for items like contacts, lists, songs, media, desirous information on persons, places, and things, and so forth. These applications are illustrative only, as others will be obvious to one of ordinary skill in the art having the benefit of this disclosure.

As shown in FIG. 6, the information presented on the display 106 fills the display presentation area. Where the electronic device 100 is a large device, e.g., a tablet having a four-plus inch display, a user may find it difficult to reach each app or user actuation target presented on the display 106 with a single hand. For example, if the user is holding the right side of the electronic device 100 with their right hand, they may find it difficult for their thumb to reach across the display 106 to actuate user actuation targets presented on the left side of the display. Embodiments of the present disclosure provide a solution to this problem by providing an electronic device 100 that can perform a function based on the type of hand as determined by the first sensor (115) and the orientation of the electronic device 100 as determined by the second sensor (116). Examples of such functions include altering data presentations occurring on the display 106. For instance, the electronic device 100 may provide an image at a position of the display 106 based on the type of hand as determined by the first sensor (115) and the orientation of the portable electronic device as determined by the second sensor (116). One example of this as a function of the first sensor (115) is shown in FIG. 7.

Figure 7:
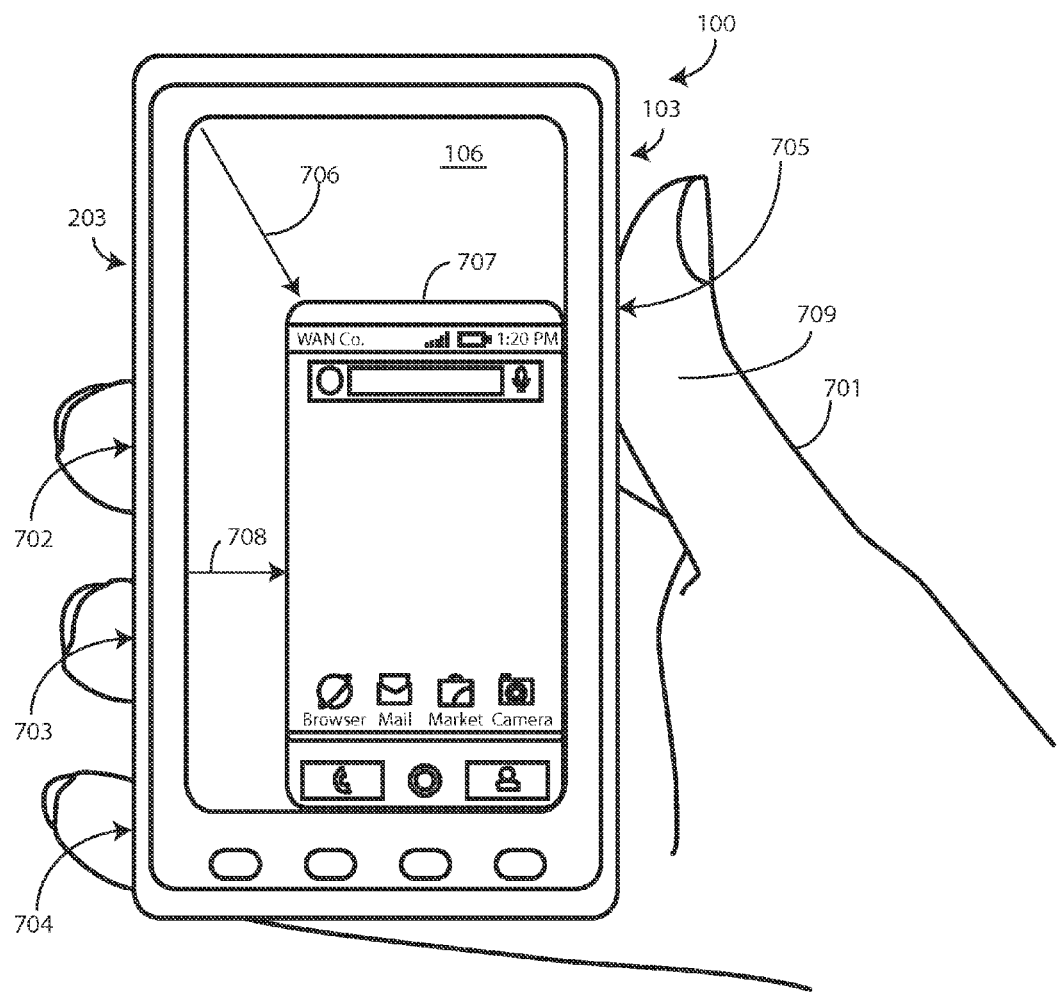
FIG. 7 illustrates one explanatory electronic device operating in a second mode in accordance with one or more embodiments of the disclosure.

Turning now to FIG. 7, a user 701 is holding the electronic device 100. The first sensor (115) detects three points of contact 702,703,704 on the second side surface 203 of the electronic device 100 with a first portion of the first sensor (115) and one point of contact 705 on the first side surface 103 of the electronic device 100 with a second portion of the first sensor (115). The control circuit (108), which is operable with the first sensor (115), uses this information to detect that the user 701 is holding the device with a first type of hand, namely the right hand. Accordingly, the control circuit (108) executes a function that depends from the input from the first sensor (115). In this embodiment, the function is a combination of reducing 706 an area 707 of data presentation on the display 106 and translating 708 the area 707 of data presentation across the display 708 so as to be more accessible to fingers of the detected type of hand. As shown in FIG. 7, the area 707 of data presentation and its associated user actuation targets are now more easily accessible by the thumb 709 of the user 701.

Figure 8:
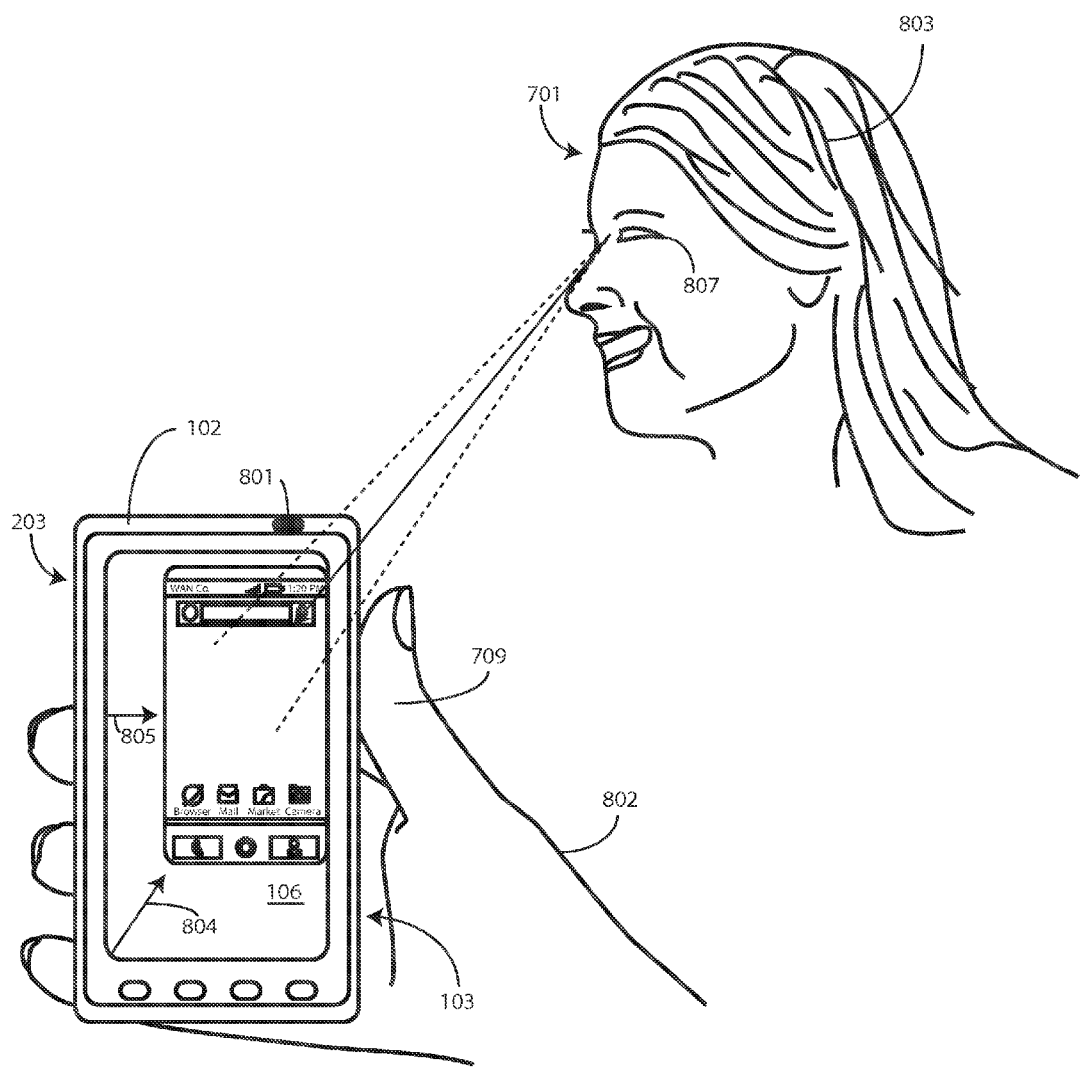
FIG. 8 illustrates one explanatory electronic device operating in a third mode in accordance with one or more embodiments of the disclosure.

As noted above, in one or more embodiments the electronic device 100 is to perform a function based on the type of hand as determined by the first sensor (115) and the orientation of the electronic device 100 as determined by the second sensor (116). This mode of operation is shown in FIG. 8. Turning now to FIG. 8, the second sensor (116) is configured as a gaze detector 801. Accordingly, the first sensor (115), which includes a first portion positioned at the first side surface 103 and a second portion positioned at the second side surface 203, detects parts of the user's hand 802 contacting the first side surface 103 and second side surface 203 of the electronic device 100, respectively. From this, the control circuit (108) is able to detect from the first and second portions of the first sensor (115) a type of hand of the user 701 supporting the electronic device 100 where the type of hand includes a first type associated with a left hand of the user 701 and a second type associated with a right hand of the user 701. In this case, the user's hand 802 is the right hand.

Concurrently, the second sensor (116) determines an orientation of a particular surface of the electronic device 100 relative to the user 701. In this illustrative embodiment where the second sensor (116) is configured as a gaze detector, the orientation includes a first orientation in which the particular surface, i.e., the front surface 102, is directed toward a user's head 803 and a second orientation in which the particular surface is directed in a direction other than toward the user's head 803. The control circuit (108) can thus perform a function based on the type of hand as determined by the first sensor (115) and the orientation of the portable electronic device as determined by the second sensor (116), which in this embodiment includes scaling 804 and translating 805 the information presented on the display 106 to be closer to the eyes 807 and thumb 709 of the user 701.

Figure 9:
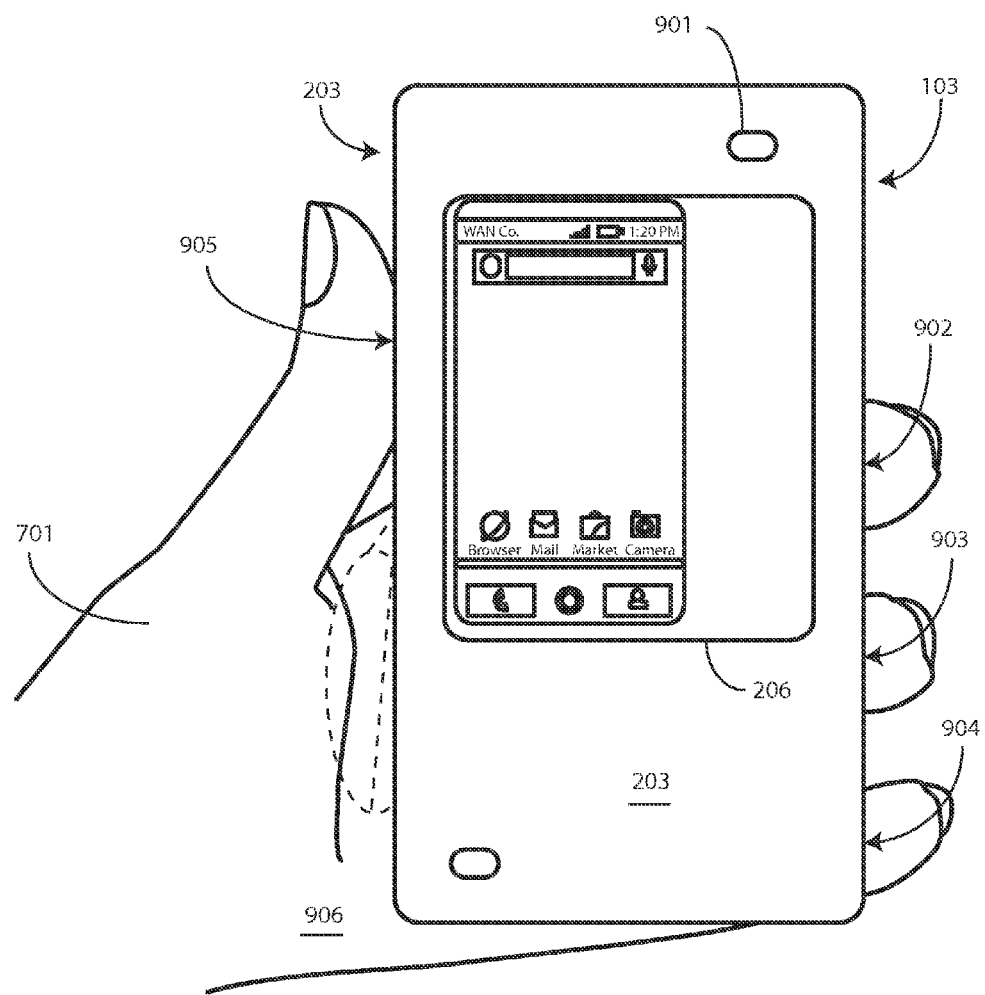
FIG. 9 illustrates one explanatory electronic device operating in a fourth mode in accordance with one or more embodiments of the disclosure.

Turning now to FIG. 9, the user 701 is holding the electronic device 100 in a different way. Additionally, the second sensor (116) is now operating as an image capture device 901. The first sensor (115) again detects three points of contact 902,903,904 on the first side surface 103 of the electronic device 100 with a first portion of the first sensor (115) and one point of contact 905 on the second side surface 203 of the electronic device 100 with a second portion of the first sensor (115). The control circuit (108), which is operable with the first sensor (115), uses this information to detect that the user 701 is holding the device with a first type of hand, namely the left hand.

Concurrently, the second sensor (116) determines an orientation of a particular surface of the electronic device 100 relative to the user 701. In this illustrative embodiment where the second sensor (116) is configured as an image capture device 901, the orientation includes a first orientation in which the particular surface, i.e., the front surface (102), is directed toward a user's palm 906 and a second orientation in which the particular surface is directed in a direction other than toward the user's palm 906. The second sensor (116) can do this in one embodiment by capturing images taken from the front surface (102) and the back surface 203 and performing image processing steps to determine which image looks more like the user's palm 906. The control circuit (108) can then perform a function based on the type of hand as determined by the first sensor (115) and the orientation of the portable electronic device as determined by the second sensor (116), which in this embodiment includes presenting information on a second display 206 disposed on the back surface 203 of the electronic device 100. To ensure the information fits within the second display 206, optional scaling, translating, and other realignment or reorientation steps can be performed as well as previously described.

Figure 10:
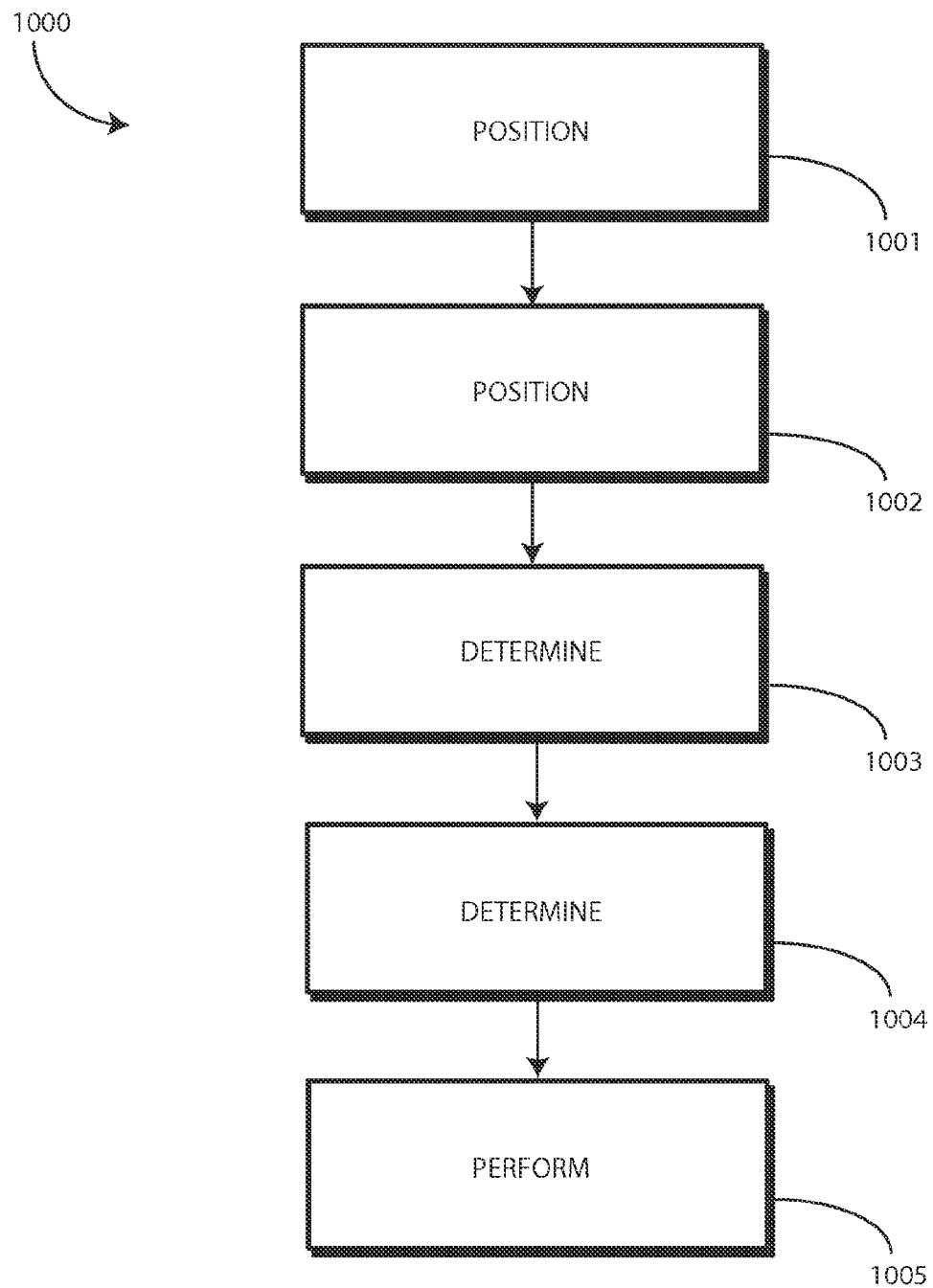
FIG. 10 illustrates explanatory methods in accordance with one or more embodiments of the disclosure.

Turning now to FIG. 10, illustrated therein is a method 1000 of a portable electronic device for detecting type and orientation of a hand of a user. In one embodiment, the method 1000 can be used with a portable electronic device including a housing having a front surface, a back surface, first and second side surfaces at either side of the front and back surfaces. The portable electronic device can also include a display position at the front surface.

At optional step 1001, the method 1000 can include positioning the back surface opposite the front surface relative to the housing. At optional step 1001, the method 1000 can also include positioning the first side surface opposite the second side surface relative to the housing. At optional step 1002, the method 1000 comprises positioning a first portion of the first sensor at the first side surface and positioning a second portion of the first sensor at the second side surface.

At step 1003, the method 1000 comprises determining, by a first sensor positioned at the first and second side surfaces, a type of hand of the user supporting the portable electronic device. In one embodiment, the hand type determined at step 1003 includes a first type associated with a left hand of the user and a second type associated with a right hand of the user. Where optional step 1001 is included, step 1003 can comprise determining the type of hand of the user supporting the portable electronic device includes detecting, by the first sensor, parts of a user's hand at substantially opposite sides of the housing. Where optional step 1002 is included, step 1003 can comprise determining the orientation of the portable electronic device includes determining the orientation of the portable electronic device is based on parts of the user's hand detected by the first and second portions.

At step 1004, the method 1000 comprises determining, by a second sensor positioned at a particular surface of the group consisting of the front surface and the back surface, an orientation of the portable electronic device relative to the user. In one embodiment, the orientation determined at step 1004 includes a first orientation in which the particular surface is directed toward a palm of the hand and a second orientation in which the particular surface is directed in a direction other than toward the palm of the hand. This can be accomplished by a variety of second sensors, including optical devices, image capture devices, light detectors, gaze detectors, orientation detectors, infrared detectors, accelerometers, and microphones as described above. For example, step 1004 can comprise capturing an image by an optical sensor. Where this is the case, step 1004 can comprise determining whether the orientation of the portable electronic device is the first orientation or the second orientation based on the image captured by the optical sensor.

At step 1005, in one embodiment the method 1000 performs, by the portable electronic device, a function based on the type of hand as determined by the first sensor and the orientation of the portable electronic device as determined by the second sensor. In one embodiment, step 1005 comprises displaying an image at a position of the display based on the type of hand as determined by the first sensor and the orientation of the portable electronic device as determined by the second sensor. In one embodiment, step 1005 comprises performing, by a processor of the portable electronic device, the function based on the type of hand as determined by the first sensor and the orientation of the portable electronic device as determined by the second sensor. Further, step 1005 can include the functions performed with reference to FIGS. 7-9 described above.

Figure 11:
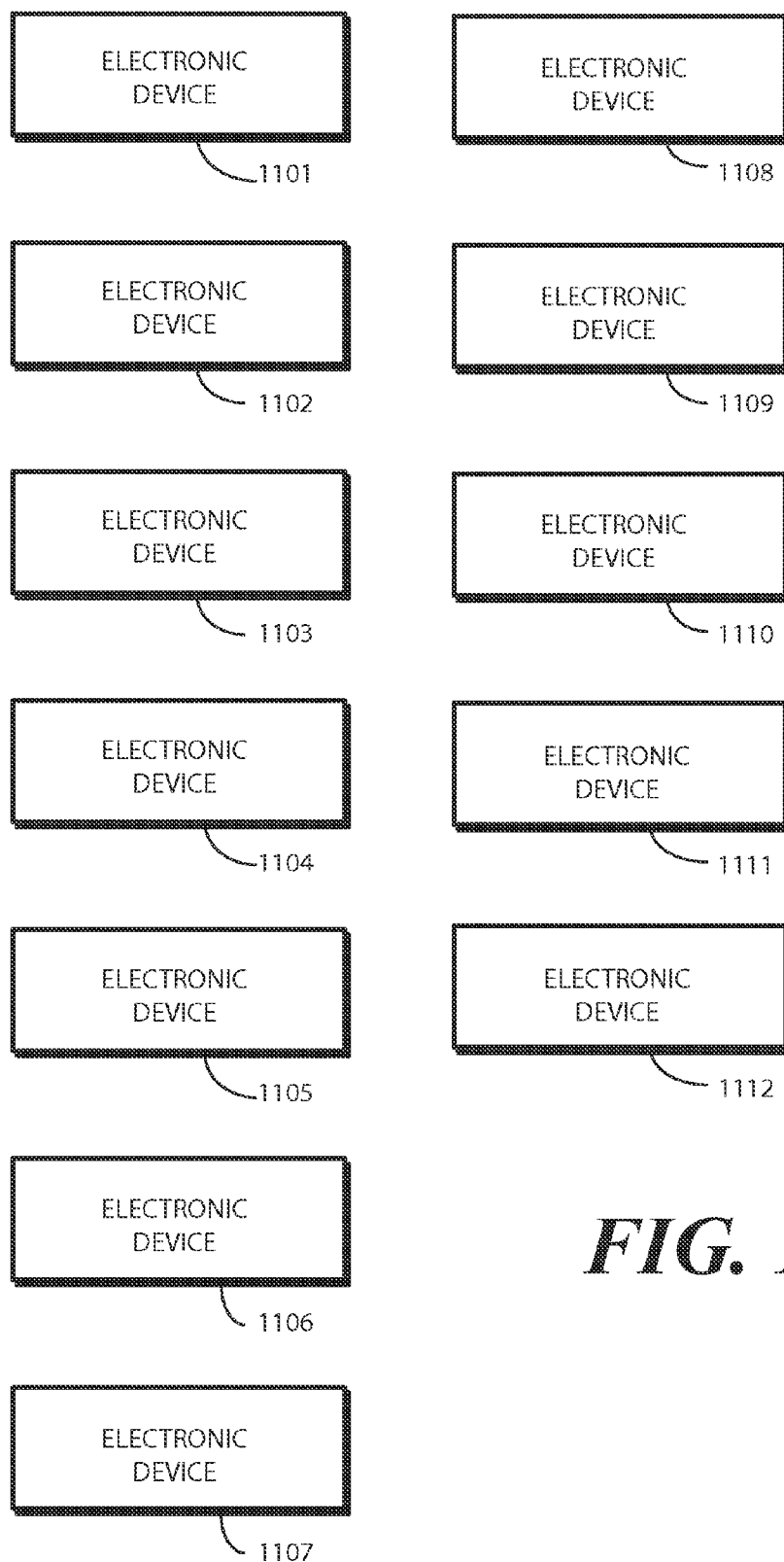
FIG. 11 illustrates various embodiments of the disclosure.

Turning now to FIG. 11, illustrated therein are various embodiments of the disclosure. At 1101, a portable electronic device for detecting type and orientation of a hand of a user comprises a housing. At 1101, the housing can have a front surface, a back surface, and first and second side surfaces at either side of the front and back surfaces. At 1101, the portable electronic device can have a display position at the front surface of the housing.

At 1101, the portable electronic device can comprise a first sensor positioned at the first and second side surfaces. In one embodiment, the first sensor determines a type of hand of the user supporting the portable electronic device. In one embodiment, type of hand includes a first type associated with a left hand of the user and a second type associated with a right hand of the user.

At 1101, the portable electronic device can comprise a second sensor positioned at a particular surface. At 1101, the particular surface can be selected from the group consisting of the front surface and the back surface. At 1101, the second sensor can determine an orientation of the portable electronic device relative to the user. At 1101, the orientation can include a first orientation in which the particular surface is directed toward a palm of the hand and a second orientation in which the particular surface is directed in a direction other than toward the palm of the hand. At 1101, the portable electronic device can perform a function based on the type of hand as determined by the first sensor and the orientation of the portable electronic device as determined by the second sensor.

At 1102, the first sensor of 1101 can include a first portion positioned at the first side surface and a second portion positioned at the second side surface. At 1102 the type of hand of the user detected at 1101 can be based on parts of the user's hand detected by the first and second portions.

At 1103, the back surface of 1101 can be positioned opposite the front surface relative to the housing. At 1103, the first side surface can be positioned opposite the second side surface relative to the housing. At 1103, the first sensor can detect parts of a user's hand at substantially opposite sides of the housing.

At 1104, the second sensor of 1101 can be an optical sensor. At 1104, the portable electronic device of 1101 can determine whether the orientation of the portable electronic device is the first orientation or the second orientation based on an image captured by the optical sensor.

At 1105, the display of 1101 can provide an image at a position of the display based on the type of hand as determined by the first sensor and the orientation of the portable electronic device as determined by the second sensor. At 1105, a control circuit of the electronic device of 1101 can perform the function based on the type of hand as determined by the first sensor and the orientation of the portable electronic device as determined by the second sensor.

At 1107, a portable electronic device is for detecting type and orientation of a hand of a user. At 1107, the portable device comprises a housing. At 1107, the housing can have a front surface, a back surface, and first and second side surfaces at either side of the front and back surfaces.

At 1107, the portable electronic device can have a display position at the front surface of the housing. At 1107, the portable electronic device can have a first sensor positioned at the first side surface and the second side surface. At 1107, the first sensor can determine a type of hand of the user supporting the portable electronic device. At 1107, the type of hand can include a first type associated with a left hand of the user and a second type associated with a right hand of the user.

At 1107, the portable electronic device can have a second sensor positioned at a particular surface of the group consisting of the front surface and the back surface. At 1107, the second sensor can determine an orientation of the portable electronic device relative to the user. At 1107, the orientation can include a first orientation in which the particular surface is directed toward a user's head and a second orientation in which the particular surface is directed in a direction other than toward the user's head. At 1107, the portable electronic device can perform a function based on the type of hand as determined by the first sensor and the orientation of the portable electronic device as determined by the second sensor.

At 1108, the first sensor of 1107 includes a first portion positioned at the first side surface and a second portion positioned at the second side surface. At 1108, the orientation of the portable electronic device is based on parts of the user's hand detected by the first and second portions.

At 1109, the back surface of 1107 is positioned opposite the front surface relative to the housing. At 1109, the first side surface is positioned opposite the second side surface relative to the housing. At 1109, the first sensor detects parts of a user's hand at substantially opposite sides of the housing.

At 1110, the second sensor of 1107 is an optical sensor. At 1110, the portable electronic device determines whether the orientation of the portable electronic device is the first orientation or the second orientation based on an image captured by the optical sensor.

At 1111, the display of 1107 provides an image at a position of the display based on the type of hand as determined by the first sensor and the orientation of the portable electronic device as determined by the second sensor. At 1112, a control circuit of the portable electronic device of 1107 performs the function based on the type of hand as determined by the first sensor and the orientation of the portable electronic device as determined by the second sensor.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A portable electronic device, comprising:
    a housing of the portable electronic device having a front surface, a back surface, and a first side surface and a second side surface at either side of the front surface and the back surface;
    a display positioned at the front surface of the housing;
    a first sensor positioned at the first side surface and the second side surface, wherein the first sensor determines a type of hand of a user supporting the portable electronic device, and wherein the type of hand includes a first type associated with a left hand of the user and a second type associated with a right hand of the user; and
    a second sensor positioned at a particular surface of the group consisting of the front surface and the back surface, wherein the second sensor determines an orientation of the portable electronic device relative to the user, wherein the orientation includes a first orientation in which the particular surface is directed toward a palm of a hand and a second orientation in which the particular surface is directed in a direction other than toward the palm of the hand,
    wherein the portable electronic device performs a function based on the type of hand as determined by the first sensor and the orientation of the portable electronic device as determined by the second sensor.

2. The portable electronic device of claim 1, wherein:
    the first sensor includes a first portion positioned at the first side surface and a second portion positioned at the second side surface; and
    the type of hand of the user is based on parts of a user's hand detected by the first portion and the second portion.

3. The portable electronic device of claim 1, wherein:
    the back surface is positioned opposite the front surface relative to the housing;
    the first side surface is positioned opposite the second side surface relative to the housing; and
    the first sensor detects parts of a user's hand at substantially opposite sides of the housing.

4. The portable electronic device of claim 1, wherein:
    the second sensor is an optical sensor; and
    the portable electronic device determines whether the orientation of the portable electronic device is the first orientation or the second orientation based on an image captured by the optical sensor.

5. The portable electronic device of claim 1, wherein the display provides an image at a position of the display based on the type of hand as determined by the first sensor and the orientation of the portable electronic device as determined by the second sensor.

6. The portable electronic device of claim 1, further comprising a control circuit of the portable electronic device performing the function based on the type of hand as determined by the first sensor and the orientation of the portable electronic device as determined by the second sensor.

7. A portable electronic device for detecting type and orientation of a hand of a user, the portable electronic device comprising:
    a housing of the portable electronic device having a front surface, a back surface, and first and second side surfaces at either side of the front surface and the back surface;
    a display positioned at the front surface of the housing;
    a first sensor positioned at a first side surface and a second side surface, wherein the first sensor determines a type of hand of the user supporting the portable electronic device, and wherein the type of hand includes a first type associated with a left hand of the user and a second type associated with a right hand of the user; and
    a second sensor positioned at a particular surface of the group consisting of the front surface and the back surface, wherein the second sensor determines the orientation of the portable electronic device relative to the user, wherein the orientation includes a first orientation in which the particular surface is directed toward a user's head and a second orientation in which the particular surface is directed in a direction other than toward the user's head,
    wherein the portable electronic device performs a function based on the type of hand as determined by the first sensor and the orientation of the portable electronic device as determined by the second sensor.

8. The portable electronic device of claim 7, wherein:
    the first sensor includes a first portion positioned at the first side surface and a second portion positioned at the second side surface; and
    the orientation of the portable electronic device is based on parts of a user's hand detected by the first portion and the second portion.

9. The portable electronic device of claim 7, wherein:
    the back surface is positioned opposite the front surface relative to the housing;
    the first side surface is positioned opposite the second side surface relative to the housing; and
    the first sensor detects parts of a user's hand at substantially opposite sides of the housing.

10. The portable electronic device of claim 7, wherein:
    the second sensor is an optical sensor; and
    the portable electronic device determines whether the orientation of the portable electronic device is the first orientation or the second orientation based on an image captured by the optical sensor.

11. The portable electronic device of claim 7, wherein the display provides an image at a position of the display based on the type of hand as determined by the first sensor and the orientation of the portable electronic device as determined by the second sensor.

12. The portable electronic device of claim 7, further comprising a control circuit of the portable electronic device performing the function based on the type of hand as determined by the first sensor and the orientation of the portable electronic device as determined by the second sensor.

13. A method of a portable electronic device, the portable electronic device including a housing having a front surface, a back surface, first and second side surfaces disposed at either side of the front surface and the back surface, and a display positioned at the front surface, the method comprising:
- determining, by a first sensor positioned at the first and second side surfaces, a type of hand of a user supporting the portable electronic device, wherein the type of hand includes a first type associated with a left hand of the user and a second type associated with a right hand of the user;
- determining, by a second sensor positioned at a particular surface of the group consisting of the front surface and the back surface, an orientation of the portable electronic device relative to the user, wherein the orientation includes a first orientation in which the particular surface is directed toward a palm of a hand and a second orientation in which the particular surface is directed in a direction other than toward the palm of the hand,
- performing, by the portable electronic device, a function based on the type of hand as determined by the first sensor and the orientation of the portable electronic device as determined by the second sensor.

14. The method of claim 13, further comprising:
- positioning a first portion of the first sensor at a first side surface; and
- positioning a second portion of the first sensor at a second side surface,
- wherein determining the orientation of the portable electronic device includes determining the orientation of the portable electronic device is based on parts of a user's hand detected by the first portion and the second portion.

15. The method of claim 13, further comprising:
- positioning the back surface opposite the front surface relative to the housing; and
- positioning a first side surface opposite a second side surface relative to the housing,
- wherein determining the type of hand of the user supporting the portable electronic device includes detecting, by the first sensor, parts of a user's hand at substantially opposite sides of the housing.

16. The method of claim 13, wherein the second sensor is an optical sensor, the method further comprising:
- capturing an image by the optical sensor; and
- determining whether the orientation of the portable electronic device is the first orientation or the second orientation based on the image captured by the optical sensor.

17. The method of claim 13, wherein performing the function includes displaying an image at a position of the display based on the type of hand as determined by the first sensor and the orientation of the portable electronic device as determined by the second sensor.

18. The method of claim 13, wherein performing the function includes performing, by a control circuit of the portable electronic device, the function based on the type of hand as determined by the first sensor and the orientation of the portable electronic device as determined by the second sensor.

* * * * *